No. 852,309.
PATENTED APR. 30, 1907.
E. E. WELCH.
GOODS HANDLER.
APPLICATION FILED JULY 11, 1906.
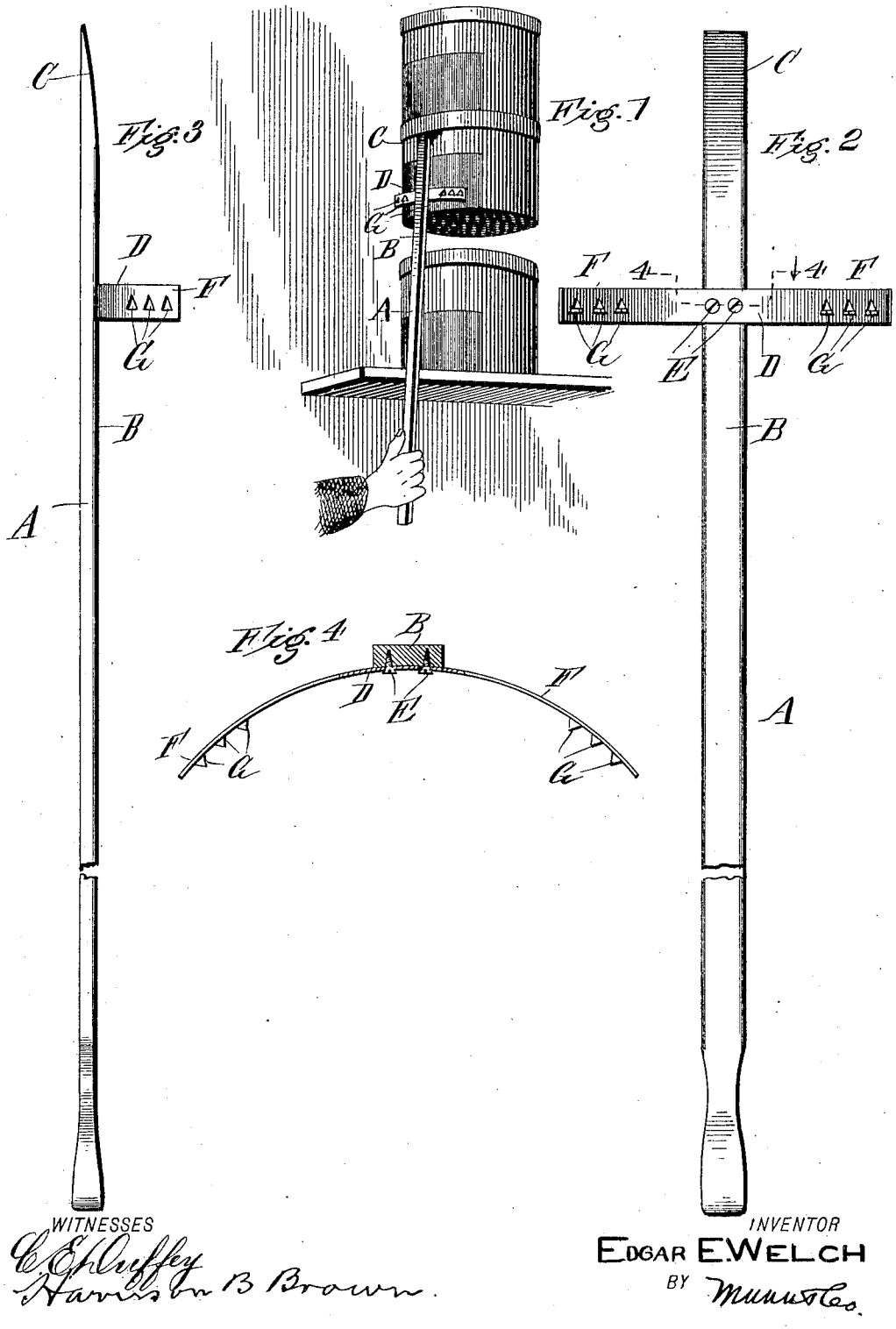
WITNESSES
INVENTOR
EDGAR E. WELCH
BY
ATTORNEYS

UNITED STATES PATENT OFFICE.

EDGAR ENSIGN WELCH, OF SPRINGDALE, ARKANSAS.

GOODS-HANDLER.

No. 852,309.  Specification of Letters Patent.  Patented April 30, 1907.

Application filed July 11, 1906. Serial No. 325,591.

*To all whom it may concern:*

Be it known that I, EDGAR ENSIGN WELCH, a citizen of the United States, and a resident of Springdale, in the county of Washington and State of Arkansas, have invented a new and Improved Goods-Handler, of which the following is a specification.

My invention relates to goods handlers for lifting boxes from shelves located above hand-reach, and has for its object, a peculiar, novel and improved device of the character stated, which in addition to its general novelty, shall be inexpensive to manufacture.

The invention consists of the special construction, arrangement and combination of parts shown by the accompanying drawing, and hereinafter fully described, the novel features being pointed out in the appended claims.

In the drawing Figure 1 is a perspective in illustration of the use of my improved goods handler. Fig. 2 is a view thereof, looking at its inner, or grappling side. Fig. 3 is a side elevation, and Fig. 4 a transverse sectional view, taken on line 4—4 of Fig. 2.

In the constructoin of my goods handler, I employ a handle A of suitable elongated length, the same being formed with a flat inner side B, and a chisel upper end C. Upon reference to Fig. 3, it will be noticed that the chisel shaped end C of the handle, is formed by beveling its inner side to an edge, in line with the outer side of the handle. On the inner side of the handle, and near its upper end, I arrange a flat bar D, and secure same to the handle with screws E. The bar D is constructed into curved shape, substantially as shown by Fig. 4, and arranged on the handle leaving arms F projecting from opposite sides thereof. On the inner curved side of the arms F, I provide engaging teeth G constructed by suitably slitting the bar and turning down the tongues thus formed, as will be understood upon reference to the several figures of my drawing. The construction of my improved goods handler will be understood from the above description. Its use is chiefly to enable a person to lift hat and similar curved boxes, from stored positions thereof, where same are located above or out of easy hand reach.

My invention comprehends forming the curved bar D of any suitable material and the provision of teeth of any character, on its inner side, having pointed ends adapted for holding engagement with the box.

When it is desired to lift one or more boxes from an elevated shelf or other position out of ordinary hand reach, the chisel shaped end of the handle is introduced between the body of the box and its cover, as shown by Fig. 1, and the toothed side of the curved bar D placed against the side of the box. Now upon effort to lift the box, the chisel shaped upper end of the handle, will effect prying action between the box and the cover flange, thereby tightening the cover on the box, and through the prying action just stated, and from weight of the box and contents, the teeth on the curved bar, will penetrate the box-body and thereby not only assist in the support of the box being lifted, but prevent swinging action thereof, thereby rendering the safe lifting of one, or more boxes at a time.

I claim—

1. A handler constructed with a handle having a beveled end, a curved bar secured to the handle near its beveled end, and teeth on the curved bar, formed by slitting it, leaving a tongue adapted to be bent out into projecting position.

2. The combination with a handle constructed with an upper beveled end, of a curved bar secured to the handle near its upper end, leaving the arm portions thereof projecting transversely from the handle, and a series of penetrating teeth on both arm portions of the bar.

EDGAR ENSIGN WELCH.

Witnesses:
 C. G. DODSON,
 C. F. RENNER.